US007777994B2

(12) United States Patent
Magnier

(10) Patent No.: US 7,777,994 B2
(45) Date of Patent: Aug. 17, 2010

(54) DEVICE FOR PREVENTING THE EXPLOSION OF AN ELEMENT OF AN ELECTRICAL TRANSFORMER

(76) Inventor: Philippe Magnier, 186 Av. du Général de Gaulle, 78260 Acheres (FR)

( * ) Notice: Subject to any disclaimer, the term of this patent is extended or adjusted under 35 U.S.C. 154(b) by 0 days.

(21) Appl. No.: 11/701,968

(22) Filed: Feb. 2, 2007

(65) Prior Publication Data

US 2008/0100972 A1 May 1, 2008

(30) Foreign Application Priority Data

Oct. 27, 2006 (WO) ................ PCT/FR2006/002421

(51) Int. Cl.
*H02H 5/04* (2006.01)

(52) U.S. Cl. .......................................... 361/37; 361/38

(58) Field of Classification Search ................... 361/35, 361/37, 38
See application file for complete search history.

(56) References Cited

U.S. PATENT DOCUMENTS

| | | | | |
|---|---|---|---|---|
| 3,691,841 | A * | 9/1972 | Lorenzino et al. | 331/66 |
| 4,117,525 | A | 9/1978 | Moore | |
| 4,254,771 | A * | 3/1981 | Vidal | 604/325 |
| 4,472,700 | A * | 9/1984 | von Gentzkow et al. | 336/57 |
| 4,623,455 | A * | 11/1986 | Adcock | 210/167.04 |
| 4,848,751 | A * | 7/1989 | Lutgen et al. | 266/44 |
| 4,887,541 | A * | 12/1989 | Rodemann | 114/68 |
| 5,534,853 | A | 7/1996 | Pioch | |
| 5,781,976 | A | 7/1998 | Stuhlbacher et al. | |
| 5,946,171 | A * | 8/1999 | Magnier | 361/37 |
| 6,244,290 | B1 * | 6/2001 | Reicin et al. | 137/312 |
| 6,640,825 | B2 * | 11/2003 | McAtarian | 137/312 |
| 6,804,092 | B1 | 10/2004 | Magnier | |
| 7,122,075 | B2 * | 10/2006 | Altmann | 96/173 |
| 2003/0141176 | A1 * | 7/2003 | Supponen | 202/96 |
| 2007/0001793 | A1 | 1/2007 | Magnier | |

FOREIGN PATENT DOCUMENTS

| | | |
|---|---|---|
| DE | 2624882 | 12/1977 |
| EP | 0238475 | 9/1987 |
| FR | 1355777 | 2/1963 |
| JP | 57007909 | 1/1982 |
| JP | 01-248603 | 10/1989 |

(Continued)

OTHER PUBLICATIONS

Merriam-Webster's Collegiate Dictionary, 1999, Merriam-Webster, 10th, 1026.*

(Continued)

*Primary Examiner*—Stephen W Jackson
*Assistant Examiner*—Tien Mai
(74) *Attorney, Agent, or Firm*—Meyertons, Hood, Kivlin, Kowert & Goetzel, P.C.; Eric B. Meyertons

(57) ABSTRACT

A device for preventing the explosion of an element of an electrical transformer provided with a tank containing a combustible cooling fluid, comprising a pressure release element for decompressing the tank, and a bag placed downstream of the pressure release element and configured to pass from a flat state to an inflated state upon the rupture of the pressure release element and for confining fluid.

22 Claims, 10 Drawing Sheets

FOREIGN PATENT DOCUMENTS

| | | |
|---|---|---|
| JP | 05029155 | 2/1993 |
| JP | 2006-295017 | 10/2006 |
| WO | 94/28566 | 12/1994 |

OTHER PUBLICATIONS

French Search Report for FR 0506661 mailed Feb. 17, 2006, 1 page.
JAGOB "The ELPYR-Fire Fighting System for Oil Immersed Transformers" OZE (1988) 41(11), 388, 11 pages.
Elektromotorenwerk Barleben Brochure, Figures.
ELIN Stufenschalter fur Transformatoren, Techincal Reference, see Figures.
ELIN ELPYR System-E, Brouchure, 4 pages.
Widenhorn et al. "Minimised Outage Time of Power Plant Units After Step Up Transformer Failure" Proceedings of Power Gen '94-Asia (1994) vol. II, p. 23-25.
Merlin Gerin "HV Three Phase SF6 Gas Insulated Switchgear", 6 pages.
Schaltanlagen, ABB Schaltanlagen GmbH, 10 pages.
PCT Search Report and Written Opinion for International application No. PCT/FR2006/002421 mailed Jul. 3, 2007, 11 pages.

* cited by examiner 1
2
2a
2b
3
4
5
6
7
8
9
9a
10
11
12
13
14
15
16
16a
16b
17
17a
17b
18
18a
19
20
20a
20b
21
31
32
56

19a
9a
34
32
31
19
183
182
181
18
16
13
2a
3
2
15
14
21
12
55
14
4
56
53
54
14
5
6
33
1
8
2

19a
9a
34
32
31
18
16
15
14
13
12
2a
2
3
4
56
5
6
33
1
8
2

DEVICE FOR PREVENTING THE EXPLOSION OF AN ELEMENT OF AN ELECTRICAL TRANSFORMER

BACKGROUND OF THE INVENTION

1. Field of the Invention

The present invention relates to the field of the prevention of the explosion of an element of an electrical transformer cooled by a volume of fluid, particularly of combustible fluid.

2. Description of the Relevant Art

Electric power transformers undergo losses, both in the windings and in the core, requiring the dissipation of the heat produced. High power transformers are therefore generally cooled by a fluid such as oil. The oils used are dielectric and are liable to catch fire above a temperature of about 140° C. Since transformers are very costly elements, their protection demands close attention.

An insulation defect initially generates a strong electric arc which activates the electrical protection systems which trip the power supply cell of the transformer (circuit-breaker). The electric arc also causes substantial diffusion of the energy which causes the liberation of gas, particularly of hydrogen and acetylene, by decomposition of the dielectric oil.

Following the liberation of gas, the pressure in the transformer tank increases very rapidly, causing an often very violent explosion. The explosion causes a considerable rupture of the mechanical links of the transformer tank (bolt, weld), placing the gases in contact with the oxygen of the ambient air. Since acetylene is autoinflammable in the presence of oxygen, a fire breaks out immediately and propagates to the other units on the site, which are also liable to contain large quantities of combustible products.

The explosions are due to insulation failures resulting from short-circuits caused by overloads, surge voltages, progressive damage to the insulation, a low oil level, the appearance of water or mold, or the failure of an insulation component.

The prior art describes fire extinguishing systems for electrical transformers which are activated by fire detectors. These systems are activated when the transformer oil is already burning. It was therefore considered sufficient to limit the fire to the equipment concerned and prevent it from propagating to the neighboring installations.

To slow down the decomposition of the dielectric fluid due to an electric arc, silicone oils can be used instead of conventional mineral oils. However, the explosion of the transformer tank due to the increase of the internal pressure is only delayed for an extremely short period, about a few milliseconds. The explosion of the tank is hence unavoidable.

WO-A 97/12 379 teaches a method for preventing explosion and fire in an electrical transformer equipped with a tank filled with a combustible cooling fluid, by detecting a rupture of the electrical insulation of the transformer by a pressure sensor, depressurization of the cooling fluid present in the tank, using a valve, and cooling of the hot parts of the cooling fluid by injecting a pressurized inert gas into the tank bottom to stir said fluid and prevent oxygen from entering the transformer tank. This method is satisfactory and serves to avoid the explosion of the transformer tank.

WO-A 00/57 438 describes a quick opening rupture element for an explosion prevention device of an electrical transformer.

Unpublished U.S. patent application Ser. No. 11/473,339 to Philippe Magnier describes a preventive device permitting extremely rapid decompression and collection of the fluid passing through the pressure release element in a hermetically sealed reservoir. This reservoir may be equipped with an outlet line which can be connected to a gas pump and an auxiliary reservoir.

The applicant has found that this type of preventive device had drawbacks for transformers placed in confined areas, and for low power transformers for which the cost of the preventive device must be reduced.

SUMMARY OF THE INVENTION

It is an object of the invention to remedy these drawbacks.

It is proposed a preventive device for a reduced available space allowing easy removal of the fluid passing through the pressure release element.

The device for preventing the explosion of an electrical transformer element, said device being provided with a tank containing a combustible cooling fluid, comprises a pressure release element placed on an outlet of the tank for decompressing the tank, and a bag placed downstream of the pressure release element and configured to pass from a flat state to an inflated state upon the rupture of the pressure release element. The bag confines the fluid passing through said pressure release element. The shape of the bag may be adapted and/or is adaptable to an available space that is reduced and/or of complex shape. The weight of the bag may be low, so that said bag can be handled by one or two operators, in the flat state or in the inflated state, essentially inflated with gases.

The preventive device is suitable for transformers placed in mine galleries in which removal of the fluid passing through the pressure release element by a line to the open air is very difficult due to the size of the galleries, the length of line required, the pressure drops in the line, and the risk of damage to the line. After rupture of the pressure release element, the bag can be isolated from said pressure release element and closed, and then conveyed by hand or on a machine to the exterior of the gallery where the fluid can then undergo appropriate treatment.

These advantages are also available in the case of a transformer placed in an underground or concrete gallery of a hydroelectric plant, often at the bottom of a dam, or a transformer installed in a tunnel, for example a road or rail tunnel, for which the presence of an additional line for collecting the gas and/or combustible liquids is undesirable. This applies in particular to power supply transformers of an electrical traction network.

The preventive device applies advantageously to transformer elements placed in the substructure of a building, for example a very tall tower in which the available space is small due to its cost, and the presence of an additional line for containing inflammable products is undesirable.

The preventive device can be installed on a buried transformer element. Such transformers are generally installed in a transformation cubicle, for example a concrete shelter arranged in a public space such as a street, and covered with a sealed cement slab. In this case, the available space is particularly small due to the compactness of the concrete shelter and the need to leave sufficient space for an operator to access the installations for maintenance or replacement operations. In the initial state, the bag occupies an extremely small volume. After rupture of the pressure release element, the bag occupies a large volume, but can be removed from the concrete shelter after removal of the slab. Handles or handling rings can be provided. An operator can then benefit from enough space for access. Thus, the small space available between the concrete shelter and the transformer normally serves for the access of an operator, and in case of tripping, for collecting the fluid passing through the pressure release element, into the bag.

The preventive device can also be installed on a transformer element supported by a pole. The explosion of such types of transformers may prove extremely dangerous for the vicinity, particularly in an urban zone. The installation of a preventive device is extremely desirable. However, for aesthetic reasons and due to the mechanical strength of the pole, the preventive device must occupy a small volume in the normal operating state of the transformer and have reduced weight. In the initial state, the bag may occupy a volume of a few liters to tens of liters and, in the inflated state, after tripping, a volume of a few hundred liters to a few $m^3$. Moreover, the inflation of the bag is visible from the exterior and provides one means for warning of a malfunction of the transformer. Such a warning is advantageous for a transformer which is not the subject of local or remote surveillance, which is the case of low power transformers.

In one embodiment, the bag is gastight.

In one embodiment, the bag is rigid in extension. The bag may comprise a gastight layer and a layer withstanding the extension, for example based on fibers, particularly aramide fibers.

In another embodiment, the bag is flexible in extension.

In one embodiment, the bag generally has a parallelepiped shape in the inflated state. The bag may also have a shape with rounded edges or a generally conical shape in the inflated state.

In one embodiment, the device comprises a bent line mounted downstream of the pressure release element. The bent line may have an angle of between 45° and 180°, bounds included, preferably 90° or higher. The bent line may be connected to an opening provided in an upper wall of the tank, for example a lid, and enables the bag to extend downward during inflation without excessive folding that could make the inflation more difficult, due to the fact that a significant quantity of liquid may be collected in the bag, a liquid tending to fall into the bottom of the bag by its weight. The bent line also serves to limit the mechanical loads applied to the link between the bag and the pressure release element.

In one embodiment, the device comprises a flexible hose mounted upstream of the bag. The flexible hose serves to adapt the position of the bag to various types of transformer and transformer environment. The flexible hose can be mounted between the bent line and the bag. The flexible hose may have a ringed shape to reduce the risk of crushing. The flexible hose can be made from a synthetic material, for example based on polyethylene, polypropylene, etc.

In one embodiment, the device comprises a bent line mounted downstream of the flexible hose. A valve can be mounted between said bent line and the bag, being integral with the bag. Thus the valve can be closed after inflation of the bag and before separating the bag from the other elements of the device. A quick coupling can be placed upstream of the bag, and integral with the bag.

In one embodiment, the device comprises a channel for introducing inert gases placed downstream of the pressure release element. After the inflation and before the removal of the bag, the inert gases can thereby be injected to expel and significantly reduce the proportion of combustible gases in an upper part of the transformer element, in the pressure release element and in any intermediate elements.

In one embodiment, the bag comprises a lockable outlet orifice. Said orifice is locked in the initial state of the bag and the inflated state and can be opened to drain the bag, after its separation from the other elements of the device. The bag can thereby be emptied, for example into a receptacle provided for the purpose.

The device may comprise a reservoir placed between the pressure release element and the bag. The reservoir may have a small volume. The reservoir may be provided with means for expulsion by inert gases.

In one embodiment, the device comprises a decompression chamber placed downstream of the pressure release element. The decompression chamber serves to reduce the pressure applied to the elements located downstream, providing the possibility of using lighter elements.

In one embodiment, the tank outlet is placed on a bottom wall of the tank, the bag being placed under the tank.

In one embodiment, the tank outlet is placed on an upper wall of the tank, the bag being placed above the tank.

In one embodiment, the bag is placed next to the tank in the inflated state.

In one embodiment, the bag is placed next to the tank in the initial state.

In one embodiment, the bag is at least partly suspended from a support. The support may comprise a bracket fixed to a vertical wall or a ring fixed to a ceiling. Such a bag offers very low resistance to inflation.

In one embodiment, the device comprises an anti-blowout protection placed at least under the bag. The anti-blowout protection may also be lateral.

In one embodiment, the device comprises a case provided with at least two shells. The case forms a housing for protection and transport for the bag in the flat state and a support for the bag in the inflated state. The shells are configured to separate when passing from the flat state to the inflated state. The upper shell may form an anti-blowout protection during a possible contact between the bag and a ceiling or an obstacle positioned above. The lower shell can form an anti-blowout protection with regard to the floor. The case can be provided with a shell separation detector. The detector can be connected to a warning transmission element. The case can be provided with an electrical lock for securing the shells.

A method for preventing the explosion of an electrical transformer element, said element being provided with a tank containing a combustible cooling fluid, comprises the following steps.

The tank is decompressed by a pressure release element placed on a tank outlet. A bag placed downstream of the pressure release element is inflated, the bag passing from a flat state to an inflated state and confining the fluid passing through the pressure release element.

According to another aspect, a device for preventing the explosion of an electrical transformer element, said element being provided with a tank containing a combustible cooling fluid, comprises a pressure release element placed on an outlet of the tank to decompress the tank and a container provided with two shells and with a bag, placed in the initial state in the shells. The bag, which is placed downstream of the pressure release element, is designed to pass from an initial state to an inflated state upon the rupture of the pressure release element, thereby causing separation of the shells and confining the fluid passing through the pressure release element.

Advantageously, the pressure release element is configured to break above a differential pressure threshold between an upstream part and a downstream part.

In one embodiment, the electrical transformer element is an electrical transformer body.

In another embodiment, the electrical transformer element is a feed-through.

In another embodiment, the electrical transformer element is a load changer.

In one embodiment, the pressure release element comprises a perforated rigid disk and a diaphragm seal. The pressure release element may also comprise a split disk. The disks may be convex in the fluid flow direction. The split disk may comprise a plurality of petals separated from one another by substantially radial slits. The petals are connected to an annular part of the disk and bear against one another via locking brackets to withstand an external pressure of the transformer tank higher than the internal pressure. The perforated rigid disk may be provided with a plurality of penetrating holes arranged near the center of the disk and from which the radial slits extend.

The diaphragm seal may consist of a thin film based on polytetrafluoroethylene. The split disk may comprise a plurality of portions capable of bearing against one another during a thrust in a radial direction.

In one embodiment, the pressure release element further comprises a disk for protecting the diaphragm seal, the disk comprising a precut thin sheet. The protective disk can be made from a polytetrafluoroethylene sheet thicker than the diaphragm seal. The cutout may be in the form of a portion of circle. The perforated rigid disk may comprise a plurality of radial slits, distinct from one another.

In one embodiment, the device comprises a plurality of pressure release elements provided to be connected to a plurality of transformer elements. A single bag can thereby serve to prevent the explosion of a plurality of transformer elements, for example, a transformer body tank, the feed-throughs and the load changers of the same transformer or of a plurality of transformers.

The device may comprise means for detecting rupture, built into the pressure release element, for detecting the pressure of the tank with regard to a predefined pressure release ceiling. The rupture detection means may comprise an electric wire which can break at the same time as the pressure release element. The electric wire may be bonded to the pressure release element, preferably on the side opposite the fluid. The electric wire may be covered with a protective film.

The preventive device is suitable for the main tank of a transformer, for the tank of the load changer or changers, and for the electric feed-through tank, the latter tank also being called "oil box". The electric feed-throughs have the role of isolating the main tank of a transformer from the high and low voltage lines to which the transformer windings are connected via output conductors. An output conductor can be surrounded by an oil box containing a certain quantity of insulating fluid. The feed-throughs and/or oil boxes are generally independent of the transformer tank in terms of fluids.

The preventive device may be provided with means for detecting the tripping of the transformer power supply cell and a control cabinet which receives the signals transmitted by the transformer sensor means and which is capable of transmitting control signals.

The invention may provide the benefit of a device for preventing the explosion of a tank of a transformer element of low weight and size, while being suitable both for low power transformers, for example on poles, and medium power transformers, for example for the electric power supply of trains, or for very high power transformers.

BRIEF DESCRIPTION OF THE DRAWINGS

The present invention will be better understood from a study of the detailed description of a number of embodiments used as nonlimiting examples and illustrated by the drawings appended hereto, in which.

DETAILED DESCRIPTION OF THE PREFERRED EMBODIMENTS

Figure 1:
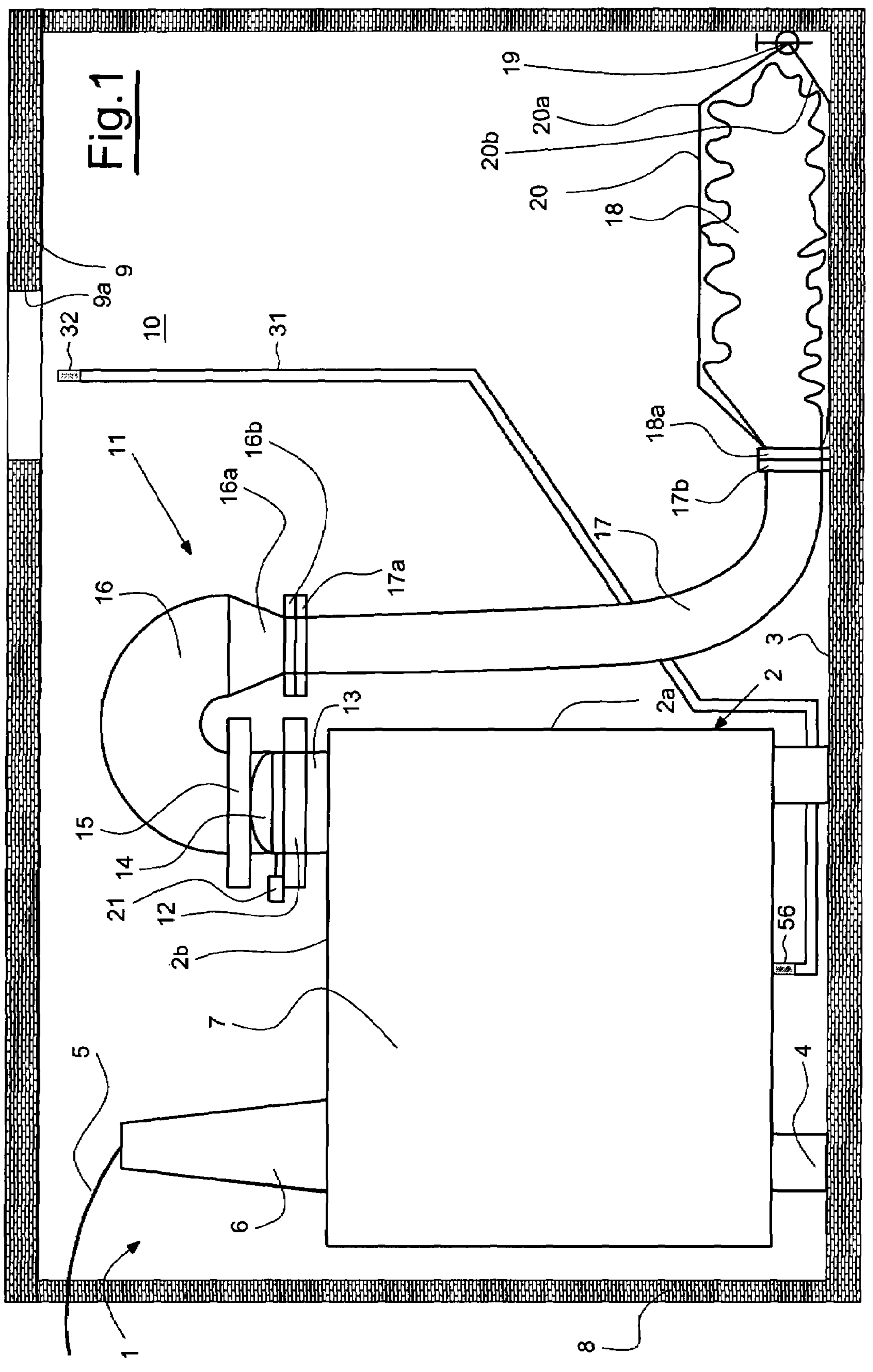
FIGS. 1 to 5, 7 and 8, are schematic views of transformers equipped with fire prevention devices according to various embodiments.

As may be seen in FIG. 1, the transformer 1 comprises a tank 2 resting on the floor 3 via legs 4 and is supplied with electric power by electrical lines 5 surrounded by feed-throughs 6. The tank 2 comprises a body 2*a* and a lid 2*b*.

The tank 2 is filled with cooling fluid 7, for example dielectric oil. As illustrated in U.S. patent application Ser. No. 11/473,339, the content of which is incorporated therein, to guarantee a constant level of cooling fluid 7 in the tank 2, the transformer 1 can be equipped with an auxiliary reservoir communicating with the tank via a line. The tank may be equipped with an automatic check valve which blocks the line when it detects rapid movement of the fluid. Thus, during a depressurization of the tank 2, the pressure in the line falls suddenly, causing incipient flow of the fluid which is rapidly stopped by the blocking of the automatic check valve. This prevents the fluid 7 contained in the auxiliary reservoir from draining out.

The transformer 1 is placed in a concrete shelter 8 comprising the floor 3 also of concrete and vertical walls thereby forming a space 10 closed by a slab 9, for example of concrete, in which a manhole 9*a* is arranged. The transformer 1 is thus placed in an enclosed space in which the preventive device 11 is also installed.

The preventive device 11 comprises a manual or motorized valve 12 connected to a hole arranged in the lid 2*b* of the transformer tank 2 by a short portion of line 13, a pressure release element 14, illustrated in greater detail in FIGS. 9 to 12, a valve 15 placed downstream of the pressure release element 14, a rigid line 16, made for example from steel and forming an elbow with an angle substantially equal to 180° and terminating on the downstream side in a convergent frustoconical portion 16*a* and a flange 16*b*. The valve 12 may, as an alternative, be replaced by a flange. The valve 15 may, as an alternative, be replaced by a flange. The bent line 16 forms a decompression chamber offering an extremely low pressure drop to the fluids passing through and thereby serving to very sharply and very rapidly reduce the pressure prevailing in the tank 2 upon the rupture of the pressure release element 14. The preventive device 11 further comprises a flexible hose 17 mounted downstream of the bent line 16 with the flange 17*a* connected to the flange 16*b* and a downstream flange 17*b*, and an inflatable bag 18 equipped with an orifice connected to the flexible hose 17 with connection by a flange 18*a* fixed to the flange 17*b*.

The flexible hose 17 can be ringed to reduce the risk of crushing and consequently the blocking of said line 17. The flexible hose 17 is advantageously made from a synthetic material, for example based on polyethylene or polypropylene, optionally reinforced with a filler.

The inflatable bag 18 is shown in FIG. 1 in the initial uninflated state. The inflatable bag 18 in the initial state may contain a small quantity of air or inert gas and is folded to be able to undergo extremely rapid inflation without any significant risk of tearing or blocking. The inflatable bag 18 may comprise a synthetic material, if necessary a multilayer material with a gastight inner layer, for example gastight to acetylene and hydrogen, and at least one mechanically strong outer layer. A first high tensile strength outer layer, thereby defining the shape of the bag 18 in the inflated state and a second perforation-resistant outer layer in order to reduce the risk of perforation by an object encountered by the bag during inflation can be provided.

Figure 2:
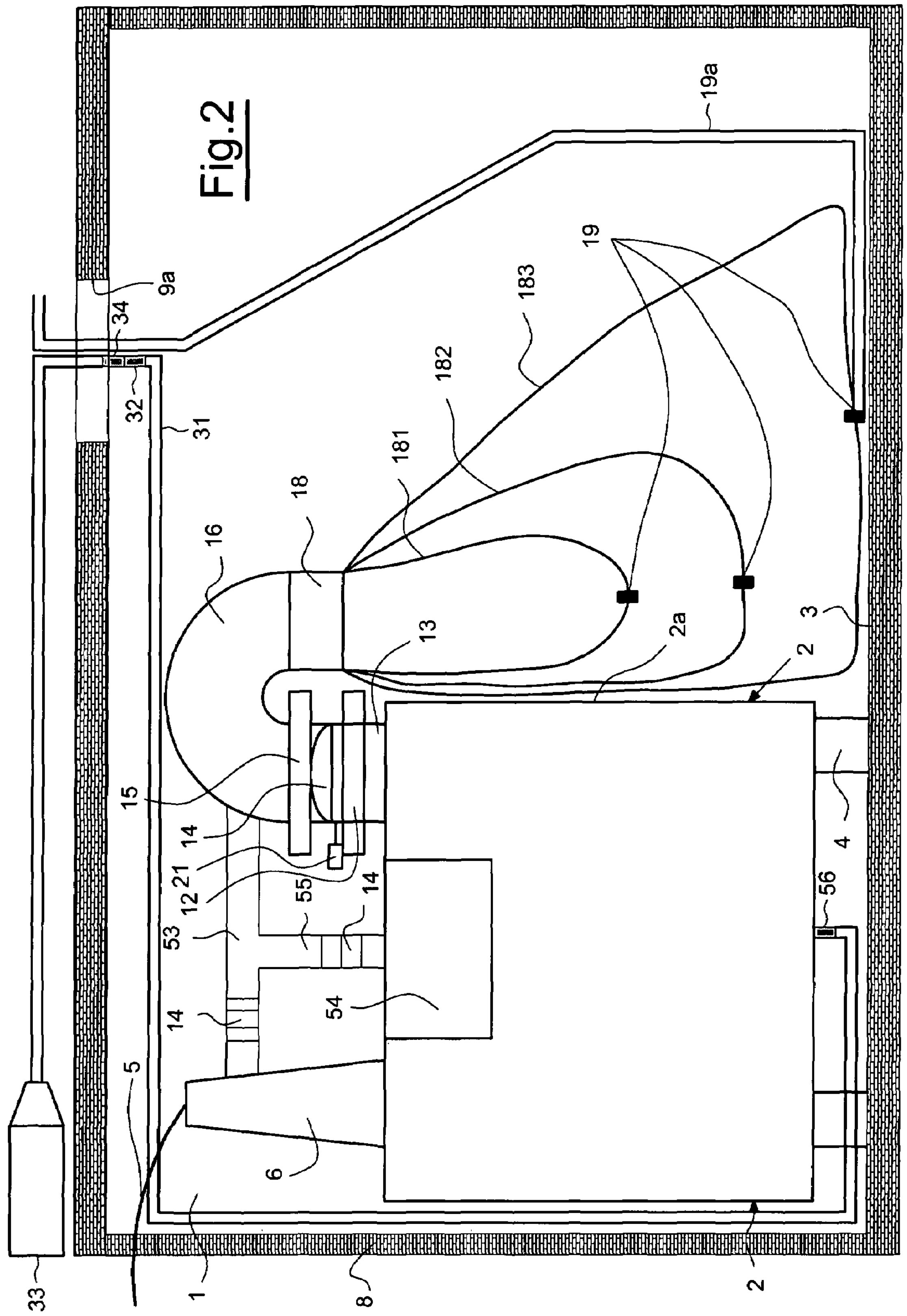

The inflatable bag 18 may be equipped with a drain valve 19 removably connectable to a reservoir for the deflation and drainage of the inflatable bag 18. The bag 18 forms a lightweight, economical, mechanically flexible fluid confining means, adaptable to various situations, compact in the initial state and versatile. A drain pipe 19*a* may be provided downstream of the valve 19, c.f. FIG. 2.

Optionally, shown in FIG. 1, the preventive device 11 comprises a case 20 provided with an upper shell 20*a* and a lower shell 20*b* placed one upon the other in the initial position shown in FIG. 1 and separable during the inflation of the inflatable bag 18, which is closed in the initial position. The case 20 offers easy handling of the bag 18 while avoiding any deformation and reducing the risk of accidental perforation or pinching. Obviously, the case 20 can be provided with handles, wheels, rings or transport hooks to facilitate its movement and its positioning on the floor 3 next to the transformer 1. The lower shell 20*b* provides protection from the floor, particularly against perforation, for example by concrete reinforcements projecting from the floor 3 or against any sharp element that may be present on said floor 3. The lower shell 20*b* also protects the inflatable bag 18 in case of the accidental presence of water or a liquid on the floor 3. The upper shell 20*a*, which may be identical to the lower shell 20*b* or, alternately, of lighter construction, can be fixed to an upper part of the bag to remain in contact with the bag during the inflation and thereby offer protection against any element encountered during the inflation of the bag, for example friction or scraping against one of the side walls of the shelter 8.

The preventive device remains in the normal operating state of the transformer as shown in FIG. 1 with the bag 18 in the initial state. The valves 12 and 15 are open. The pressure release element 14 is intact and closed. Upon the occurrence of a pressure exceeding the threshold rupture pressure of the pressure release element 14, inside the tank 2 of the transformer 1, the pressure release element 14 breaks, thereby offering a passage for the fluid present in the tank 2. Said fluid spreads in the bent line 16, thereby first depressurizing the tank 2, and then in the flexible hose 17 and in the inflatable bag 18. The inflatable bag 18 is progressively filled with fluid to occupy a final volume in the considerably larger final state, the height of the inflatable bag 18 in the inflated state possibly being close to the total height of the space 10. The inflatable bag 18 thereby offers a considerable expansion volume to the tank 2 of the transformer 1. This volume may be about 1 to 2 $m^3$ for a transformer with power from 0.1 to 20 MVA, 2 to 4 $m^3$ from 10 to 100 MVA, and 4 to 9 $m^3$ from 50 to 1000 MVA.

During the inflation, the fluid entering the inflatable bag 18 comprises a proportion of liquid and gas which depends on the defect of the transformer which caused the generation of the gas and which is consequently unpredictable. When the generation of gas in the tank 2 of the transformer 1 ceases, the inflatable bag 18 is in the more or less inflated state. It is then recommended to leave the transformer 1 in a state of rest for a few minutes or a few hours, thereby permitting the temperature to fall and become more uniform. The preventive device 11 is then separated from the transformer 2, for example by closure of the valves 12 and 15 and separation from their connection.

It is also possible to block the flanges 17*b* and 18*a*, the flange 18*a* being provided with a valve. In this case, it is advisable to first block the valve 13 and then flush with an inert gas, for example nitrogen, from downstream of the valve 13, for example by an injection tube 21 which can be connected to a nitrogen cylinder and/or by the valve 56 in the bottom of the tank 2, the valve 56 being connected to a line 31 equipped with a quick coupling 32 for connection to an inert gas source. Any combustible gases are thereby expelled from the bent line 16 and from the flexible hose 17, and the bag 18 can then be blocked at the inlet flange 18*a*. The bag 18 in the inflated state can then be conveyed away from the transformer and in the open air, rapidly and easily. Once in the open air, it is possible to release the gases present in the bag which no longer risk intoxicating the operators, and recover the liquid phase for recycling or destruction in an appropriate installation. Alternatively, it is also possible to destroy or recycle the gases present in the inflatable bag 18.

The embodiment shown in FIG. 2 is similar to the one shown in FIG. 1, with the difference that the bent line 16 has no convergent part. The bag 18 is fixed to the downstream orifice of the bent line 16 and is provided to deploy downward during inflation. The fine lines show three successive inflation positions of the bag 18 referenced respectively 181, 182 and 183. The inflatable bag 18 in its final state 183 rests on the floor 3. If a liquid is present in the bag 18, the mass of liquid rests on the floor 3 and not on the connection, for example a flange, between the bag 18 and the bent line 16. This prevents high mechanical loads from being applied to the bent line 16, thereby lightening the mechanical parts through which such a load would be transmitted.

Obviously, the shape of the bag in the successive states 181, 182 and 183 is given here as an example. In case of a low power defect, the volume of fluid present in the inflatable bag may be relatively small and the inflation can stop in the intermediate state 181. At equivalent fluid volume, a high proportion of liquid in the fluid has a tendency to drag the bottom of the bag toward the flow. A high power defect but occurring in an upper part of the transformer tank will have a tendency to generate a high volume of fluid with a low proportion of liquid, causing powerful inflation of the bag 18 with a shape that could prove to be quite different from the state 183.

Figure 3:
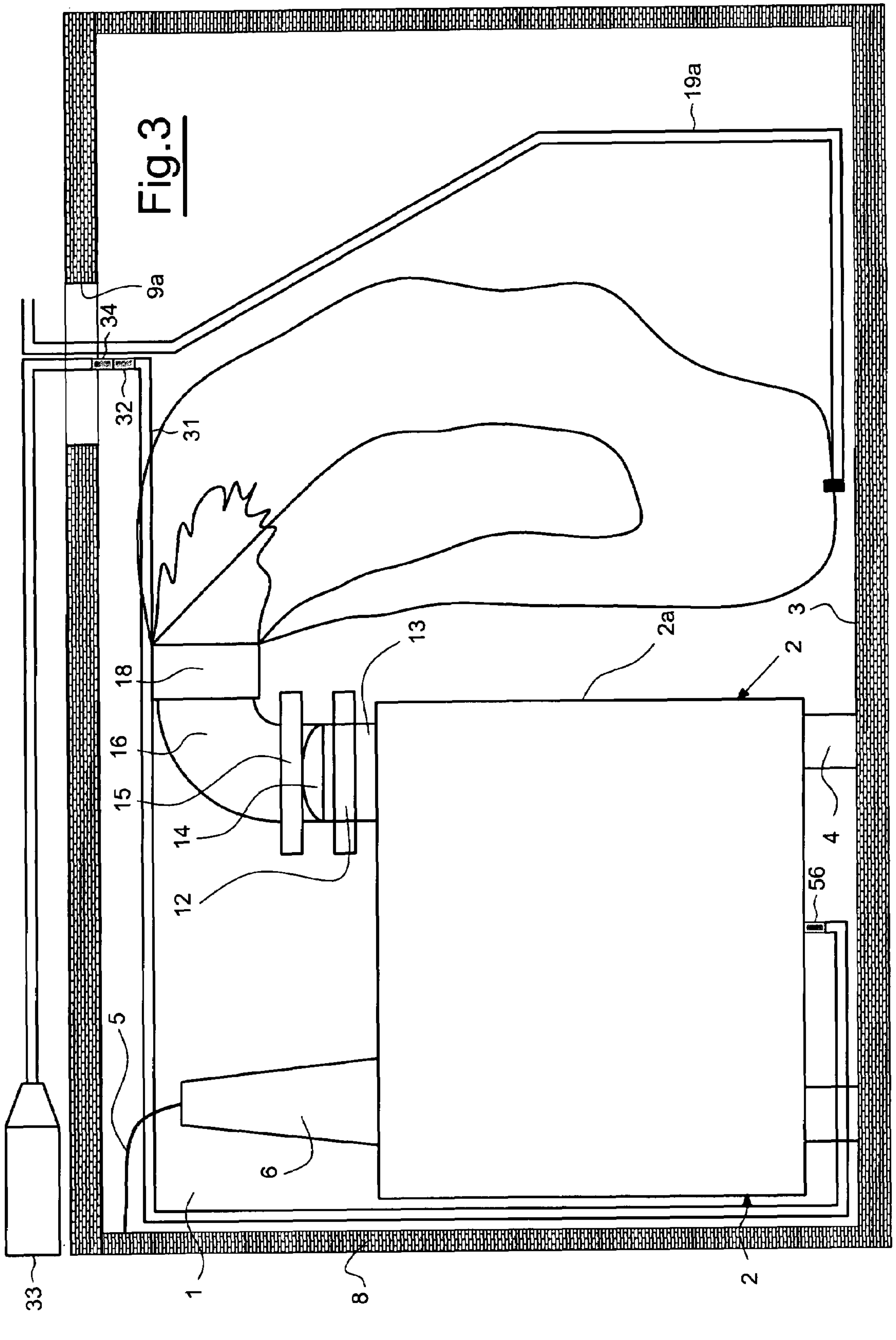

The embodiment shown in FIG. 3 is similar to the one shown in FIG. 2, with the difference that the bent line 16 has an angle of about 90°. The bag 18 is connected to the outlet orifice of the bent line 16, said outlet orifice has a substantially horizontal or slightly downwardly inclined axis. During inflation, the inflatable bag 18 begins to extend along the axis of the outlet orifice and then is deformed downward under the effect of the mass of liquid present in said bag.

Figure 4:
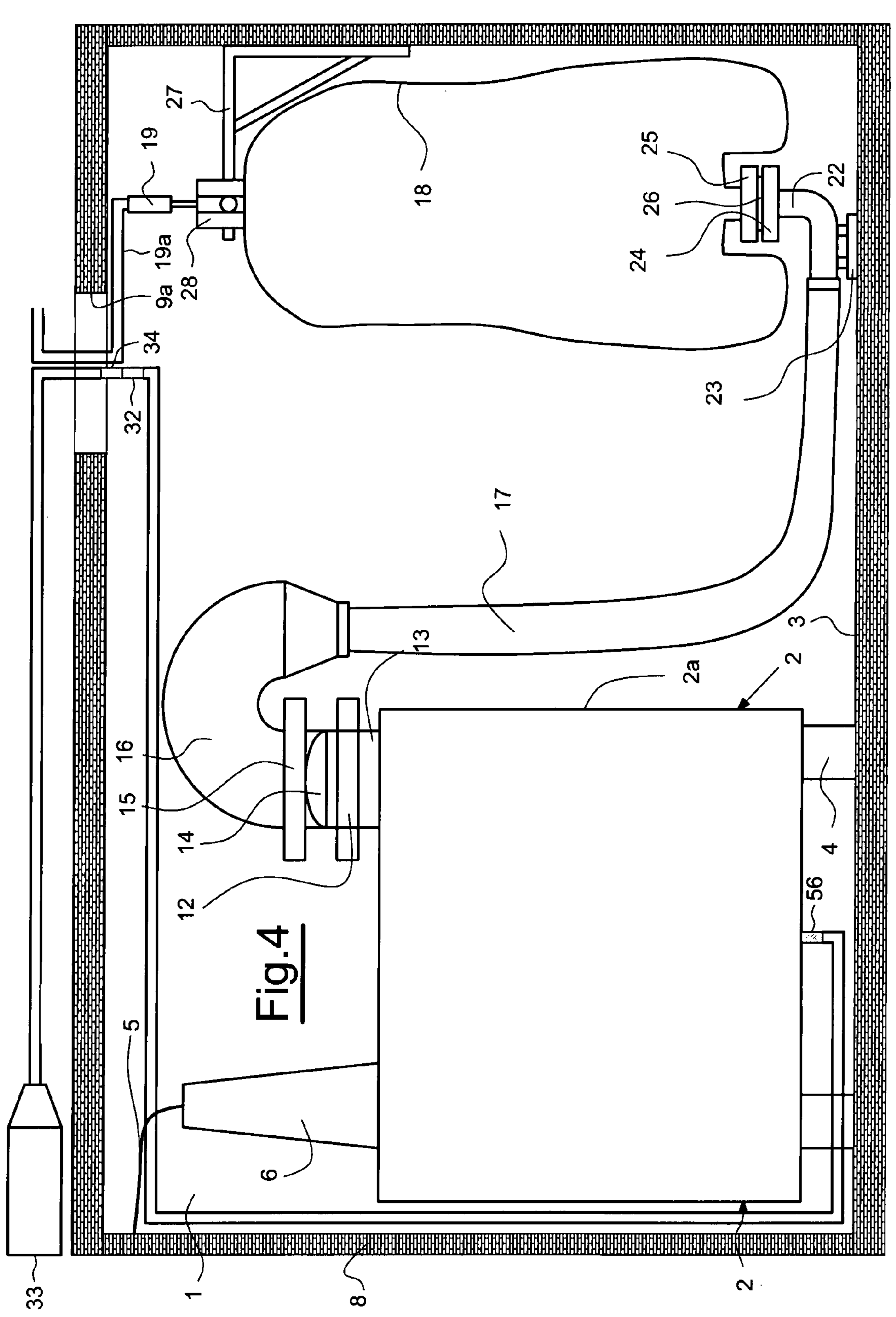

The embodiment shown in FIG. 4 is similar to that shown in FIG. 1, with the difference that the bottom end of the flexible hose 17 is connected to the inlet orifice of a line 22. The line 22 may be rigid, for example made from steel, and bent so that its outlet orifice is directed upward. The line 22 can rest on the floor 3 via a support 23. The bag 18 is mounted on the outlet orifice of the line 22. Flanges 24 and 25 respectively integral with the line 22 and with the floor 18 can be provided for this purpose. A valve 26 can also be placed between the flanges 24 and 25. The end of the bag opposite the flange 25 is fastened at the top, by a support 27, for example a bracket anchored in the vertical wall of the shelter 8. This alternative is advantageous in the case in which the slab 9 has to be removed for access to the transformer 1. In the case in which access can be obtained laterally, the support 27 can be anchored in the slab 9. The bag 18 may be provided with a hooking part 28, for example a ring on the support 27. The bag 18 is shown in FIG. 3 in an inflated state. In the initial state, the bag 18 is elongated between its inlet end formed by the flange 25 and the hooking part 28. This makes it particularly easy to inflate the bag 18 and causes an even lower pressure drop than in the preceding embodiments. Furthermore, the bag 18 is properly secured by the two ends and the shape it assumes upon inflation is better controlled. This embodiment is particularly advantageous in the case in which the bag has to be placed near fragile equipment which must not be disturbed by the inflation of the bag 18.

Figure 5:
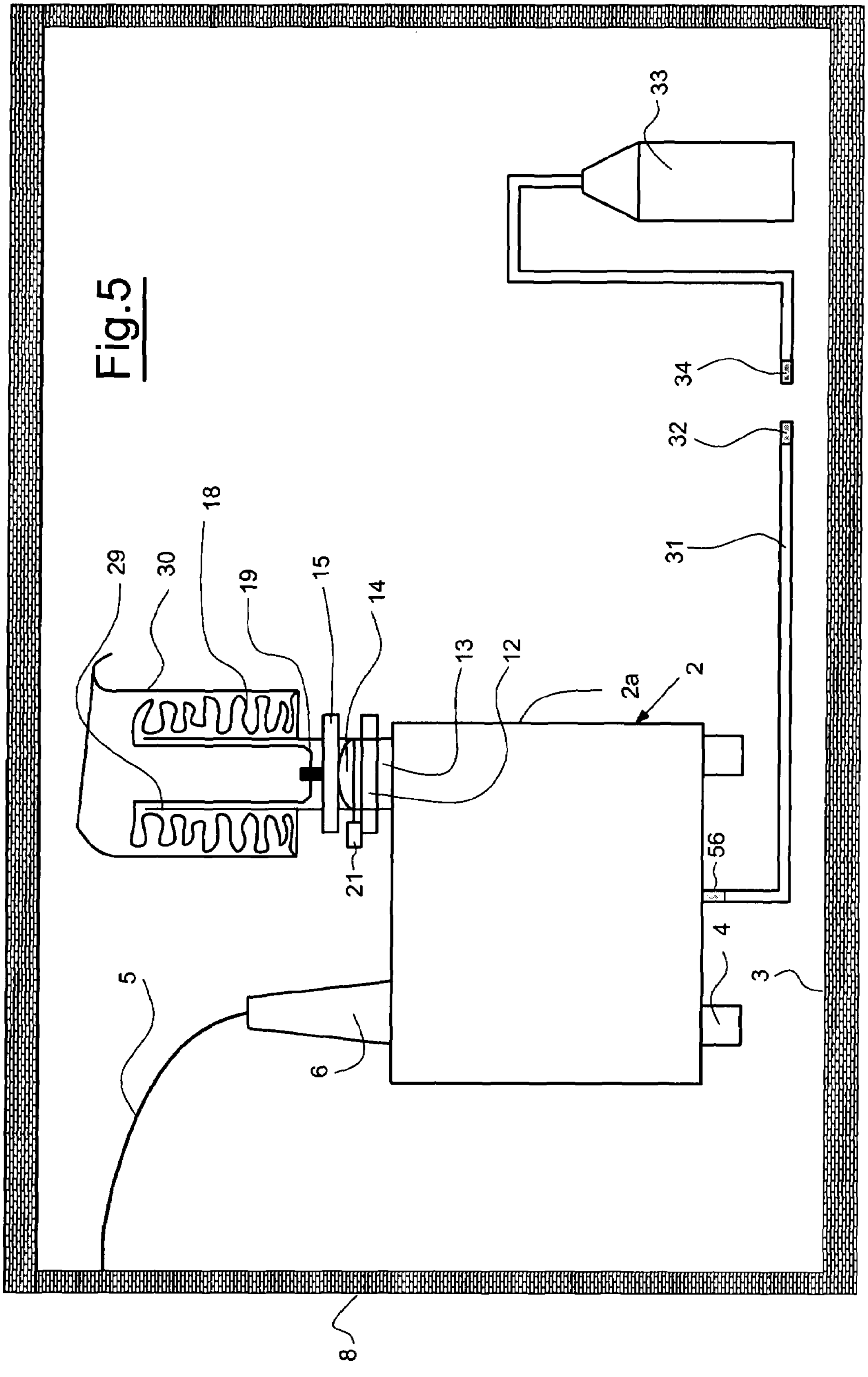

The embodiment shown in FIG. 5 is similar to that shown in FIG. 2, with the difference that the preventive device lacks a bent line. A short portion of straight line 29 is placed downstream of the flange 15. A basket 30 is mounted around the straight line 29 for supporting the bag 18. The basket 30 has an annular bottom placed around the line 29 slightly downstream and above the inert gas injection channel 21. The basket 30 has an upper end extending beyond the line 29 and slightly curved to direct the expansion of the bag 18 during the inflation, outside the upper wall 2*b* of the transformer 2 and opposite the feed-throughs 6.

The inflatable bag 18 is shown in FIG. 5 in the pleated state and comprises one end fixed to the free end of the line 29 and the opposite end installed in the line 29 close to the flange 15. The inflatable bag 18, in the initial state, has many pleats arranged in the space existing between the line 29 and the basket 30. During the inflation, after the rupture of the pressure release element 14, the end of the bag 18 is expelled from the interior of the line 29, then pushed outside the basket 30, causing the progressive unfolding of the pleats of the bag 18 installed in the annular space of the basket 30 outside the line 29. Due to the inclination of the upper end of the basket 30, the deployment of the bag 18 upon inflation is oriented outside the upper surface of the transformer, so that the inflatable bag 18 can rest on the floor, in the inflated state, next to the transformer 1.

Furthermore, the tank 2 of the transformer 1 is equipped with an inert gas injection line 31 discharging into the bottom of the tank 2 and equipped at its opposite end with a quick coupling for connection to a cylinder of inert gas 33, for example nitrogen, also provided with a supplementary quick coupling 34.

Figure 6:
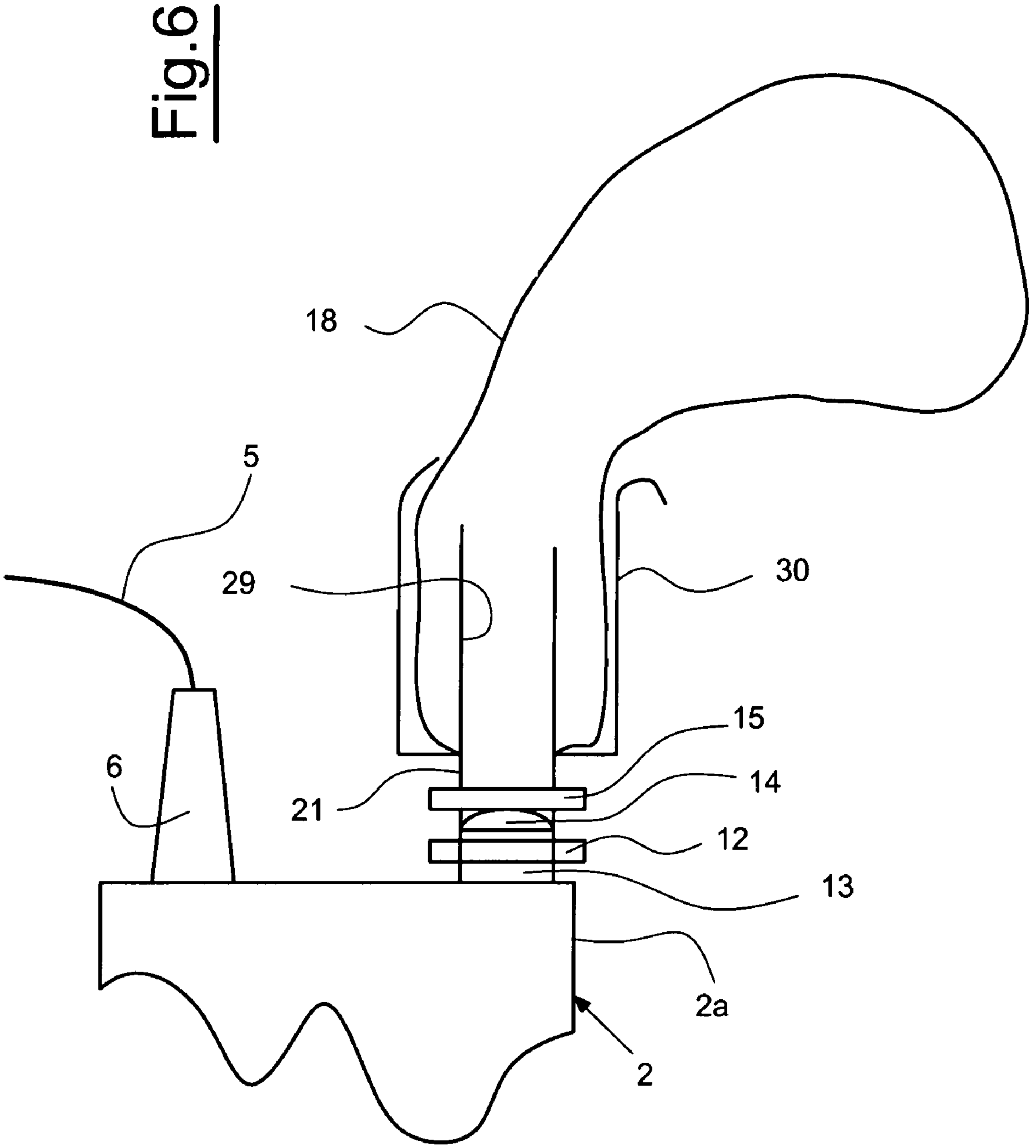
FIG. 6 shows the preventive device of FIG. 5 in deployment.

The embodiment shown in FIG. 6 is similar to the preceding one with the difference that the bag 18 is fixed to the line 29 immediately next to the bottom of the basket 30 and not to the free end of the line 29 as previously. The inflatable bag 18 is shown during inflation. The main volume of the bag 18 can be observed to be already outside the vertical of the transformer 1.

Figure 7:
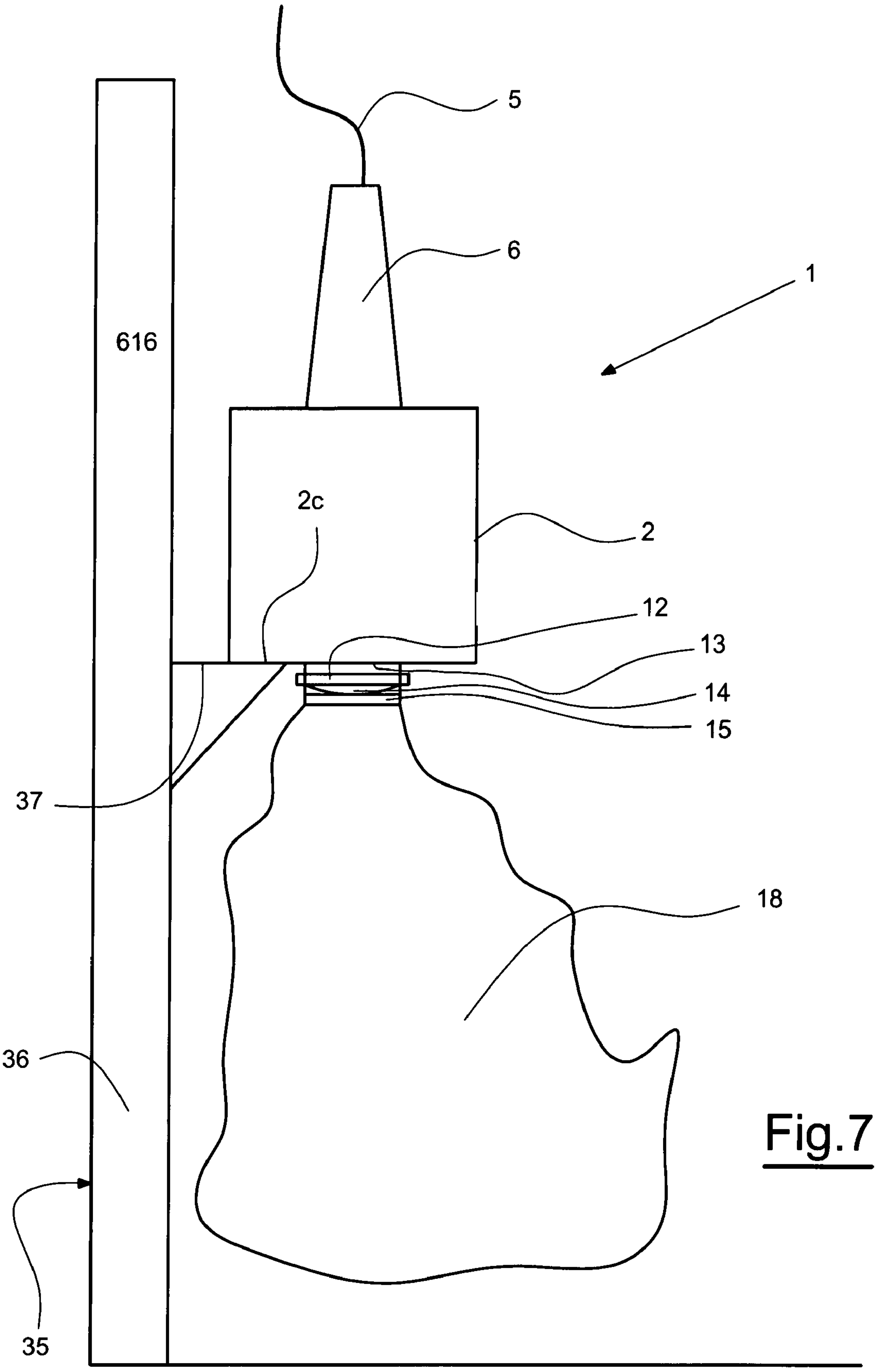

The embodiment shown in FIG. 7 is similar to the one shown in FIGS. 5 and 6, with the difference that the transformer 1 rests on a support 35, for example a pole 36, or tower, fixed to the floor and a bracket 37 overhanging the pole 36. The transformer 1 is therefore placed high above the ground, generally at a height of between 3 and 10 meters. The pressure release element 14 is installed in a hole made in the bottom 2*c* of the tank 2 of the transformer 1 along a downward axis. The rupture pressure of the pressure release element 14 is calibrated to take account of the pressure applied by the fluid present in the tank. The inflatable bag 18 is placed downstream and close to the pressure release element 14 and is provided for inflation with downward expansion.

This embodiment has the advantage of extremely low operating cost and an inflation of the inflatable bag 18 visible from the exterior, providing particularly simple visual inspection. The inflatable bag 18 performs a dual function of collecting the fluid present in the tank 2 in case of excessive pressure, generally due to an electrical fault, and of indication of such a fault. The mechanical strength of the walls of the bag 18 is also aimed to be higher than in the other embodiments insofar as the bag 18 is largely filled with liquid when it has to withstand the mass by its fastening to the tank 2.

Figure 8:
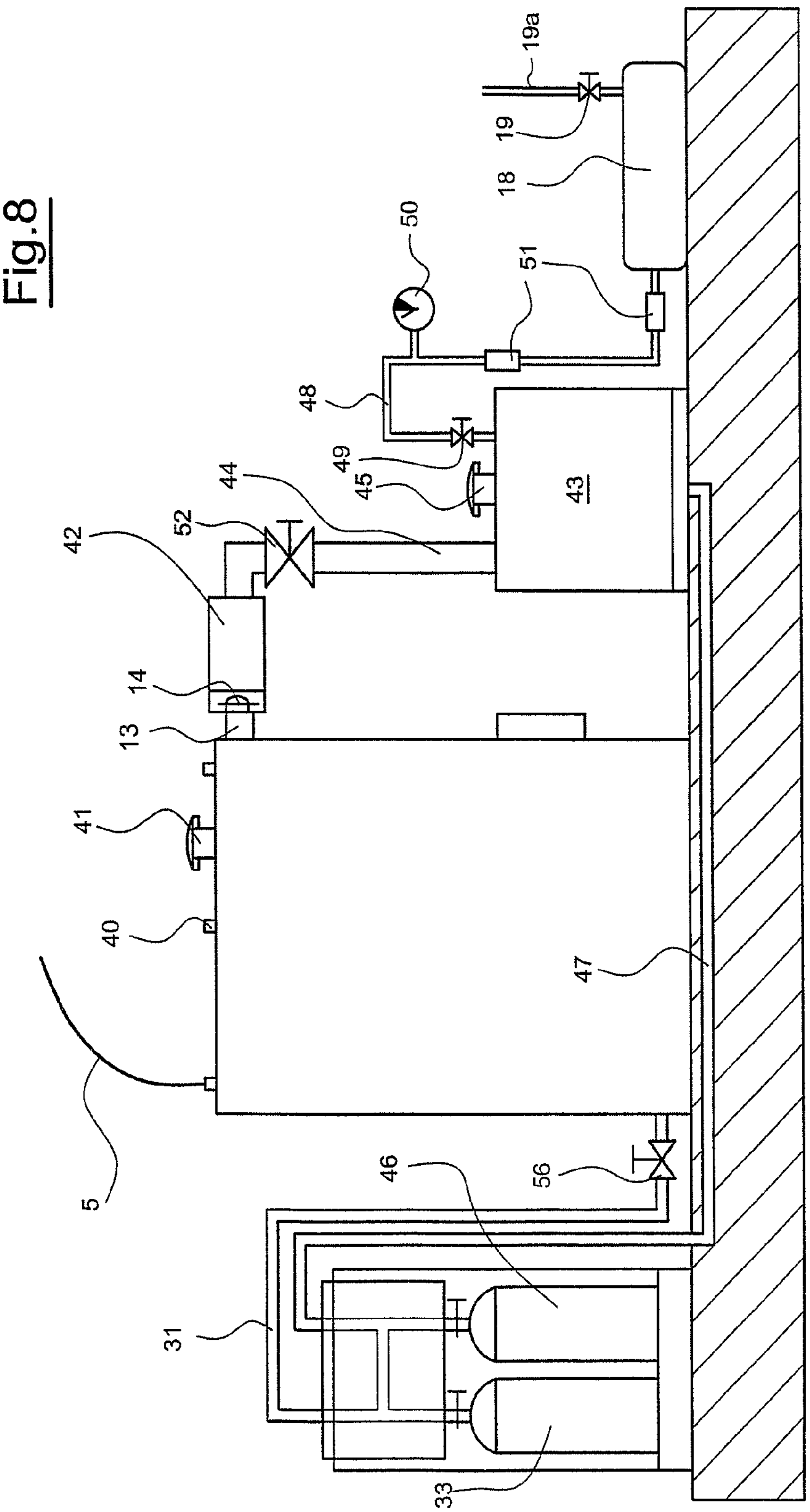
Figure 9:
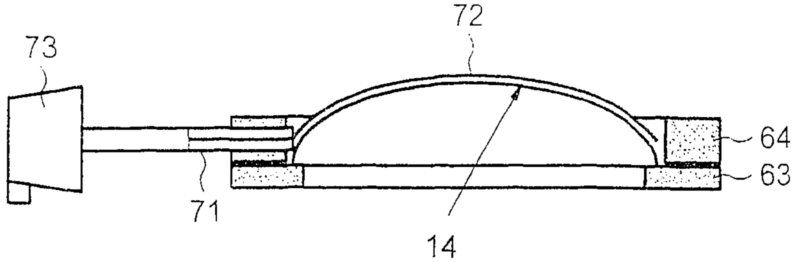
FIG. 9 shows a cross section of a rupture element.
Figure 10:
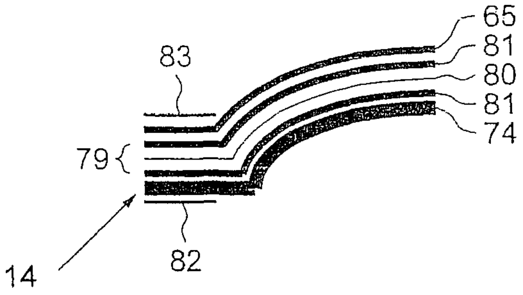
FIG. 10 is an enlarged partial view of FIG. 9.
Figure 11:
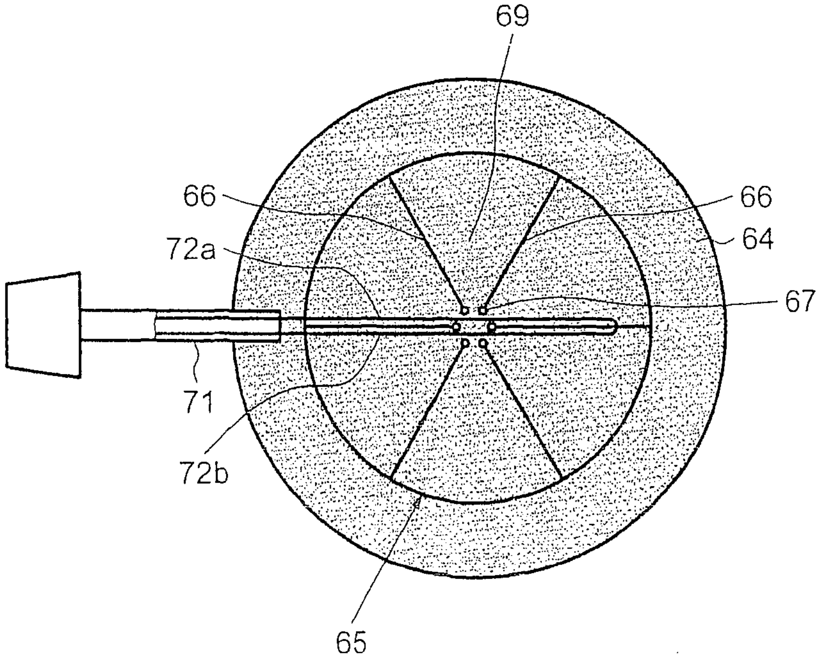
FIG. 11 is a plan view corresponding to FIG. 9.
Figure 12:
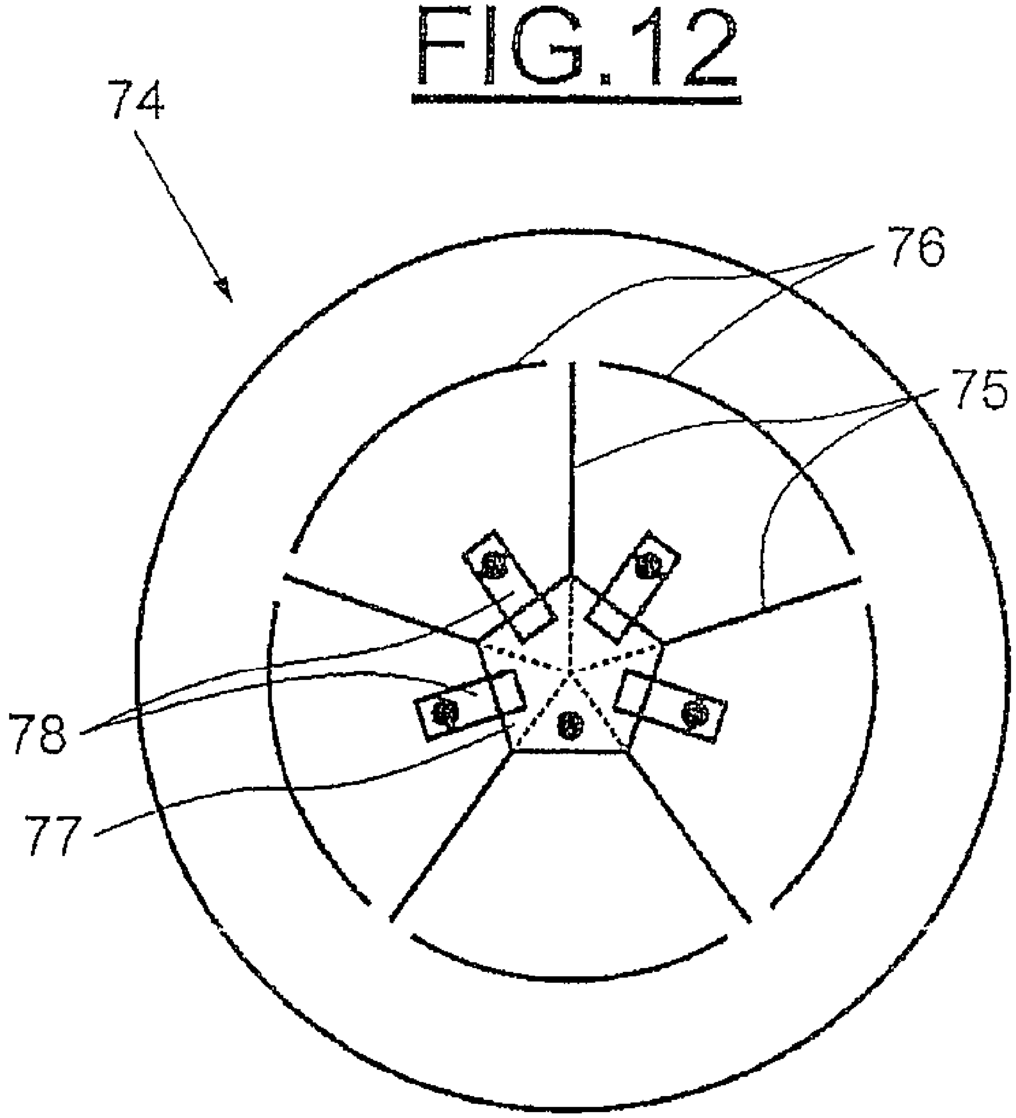
FIG. 12 is a view from below corresponding to FIG. 9.

In the embodiment shown in FIG. 8, the transformer 2 is further equipped with fire detectors 40 providing additional safety and a pressure release valve 41 also providing additional decompression, particularly for low power defects and in case of expansion. The pressure release element 14 is placed in a line 13 with a substantially horizontal axis and mounted on a vertical wall of the transformer close to its upper end.

A decompression chamber 42 is mounted downstream of the rupture disk 14 at a very short distance therefrom and has a large inside diameter to offer a particularly low pressure drop and permit a rapid decrease of the pressure in the tank 2 of the transformer 1. The depressurization chamber 42 has a diameter larger than that of the pressure release element 14. A collecting reservoir 43 with a large volume, for example of between 1 and 16 $m^3$, is connected downstream of the depressurization chamber 42 by a line 44 with a smaller diameter than that of the depressurization chamber 42. The reservoir 43 is of the rigid type, for example made from plate metal, and may be equipped with a pressure release valve 45, similar to the pressure release valve 41.

As in the embodiment shown in FIG. 5, the tank 2 of the transformer 1 is connected to an inert gas cylinder 33 by a fixed line 31 equipped with a valve 56, of the manual or motorized type. The valve 56 may be manual, the applicant having found that nitrogen can be injected for a long time after the tripping of the pressure element 14 in order to expel the gases, such as hydrogen or acetylene, which are autoinflammable in the presence of oxygen of the air. The opening of the valve 56 to expel the inert gases in the tank 2 of the transformer 1 can be carried out several hours or even several days after the tripping of the rupture element 14. Another advantage resides in the fact that the temperature of the transformer and of the fluids has then fallen substantially to ambient temperature, reducing the risks of ignition in case of accidental contact with the ambient air and reducing the risks of burns for the operators. The preventive device 11 comprises another inert gas cylinder 46 connected by a line 47 to the reservoir 43 for expelling the combustible gases present in the reservoir 43.

Downstream of the reservoir 43, a line 48 is provided equipped with a valve 49, manual or motorized, a pressure gauge 50 and terminating via quick connectors 51 in an inflatable bag 18 of the same type as the one shown in FIG. 1.

Upon the tripping of the pressure release element 14, following an electrical fault in the transformer 1, the pressure in the tank 2 drops. A jet of gas and/or liquid passes through the pressure release element 14 and spreads in the depressurization chamber 42, then flows into the line 44 toward the collecting reservoir 43. In the normal operating condition, the valve 52 is open.

After the tripping of the pressure release element 14, inert gas is injected to flush the bottom of the tank 2 of the transformer 1. The gases resulting from the decomposition of the dielectric oil and stagnating in the tank 2 are then removed to the collecting reservoir 43. An inert gas flush can be carried out while opening the valve 49. The combustible gases present in the collecting reservoir 43 are then expelled via the line 48 and recovered in the inflatable bag 18 which then passes from an initial uninflated state to a final inflated state. As soon as a predefined maximum pressure has been reached, visible on the pressure gauge 50, the gas flush can be interrupted and the valve 49 closed. An operator can then separate the quick connector 51, for example of the self-blocking type, and remove the inflatable bag 18 in the inflated state. The line 48 being connected to an upper end of the collecting reservoir 43, the fluid passing through the line 48 essentially consists of gas. The weight of the inflatable bag 18 in the inflated state is therefore close to that of the same bag 18 in the initial state. One or two operators can therefore easily move the bag 18 in the inflated state, and for example, convey it to the open air to purge it of its gases and restore it to its initial state in order, if necessary, to repeat the purge operation and completely purge the collecting reservoir 43.

Potentially hazardous gases can thereby be purged from a transformer and a collecting reservoir placed in relatively inaccessible premises, particularly underground, using a lightweight inflatable bag 18 which can be transported manually by one or two operators or even by a wheelbarrow or by any lightweight, compact and cheap handling means. Any liquids present in the collecting reservoir 43 can be purged by transfer to a mobile reservoir by a bottom valve not shown.

The fire detectors 40 can also cause the injection of nitrogen in case of fire.

Obviously, the preventive device is also suitable for securing a feed-through 6 containing dielectric oil, for example by means of the line 53 shown by a dotted line in FIG. 2, also equipped with a pressure release element 14 and discharging into the bent line 16. A low changer 54, which is part of the transformer 1, can also be equipped with a preventive device by a line 55, shown by a dotted line in FIG. 2, also equipped with a pressure release element.

As shown in FIGS. 9 to 12, the rupture element 14 has a convex circular shape and is provided to be mounted on an outlet orifice, not shown, of a tank 2 closely held between two disk-shaped flanges 63, 64. The release element 14 comprises a retaining part 65 in the form of a thin metal voile, made for example from stainless steel, aluminum, or aluminum alloy. The thickness of the retaining part 65 may be between 0.05 and 0.25 mm.

The retaining part 65 is provided with radial grooves 66 dividing it into several portions. The radial grooves 66 are excavated in the thickness of the retaining part 65 so that a rupture occurs by tearing of the retaining part 65 at its center and without any fragmentation, to prevent fragments of the release element 14 from being torn away and moved by the fluid passing through the release element 14 with the risk of damaging a downstream line.

The retaining part 65 is provided with very small diameter penetrating holes 67 distributed one per groove 66 close to the center. In other words, several holes 67 are arranged in a hexagon. The holes 67 form incipient low-strength tears and guarantee that the tear begins at the center of the retaining part 65. The formation of at least one hole 67 per groove 66 ensures that the grooves 66 will separate simultaneously by offering the largest possible flow passage. As an alternative, the number of grooves 66 may be different from six, and/or several holes 67 can be provided per groove 66. The seal coating 80 is capable of blocking the holes 67.

The burst pressure of the release element 14 is determined, in particular, by the diameter and position of the holes 67, the depth of the grooves 66, the thickness and composition of the material forming the retaining part 65. Preferably, the grooves 66 are formed on the whole thickness of the retaining part 65. The rest of the retaining part 65 may have a constant thickness.

Two adjacent grooves 66 form a triangle 69 which, during the rupture, separates from the neighboring triangles by tearing of the material between the holes 67 and deforms downstream by folding. The triangles 69 bend without tearing to avoid the extraction of said triangles 69 liable to damage a downstream line or to hinder the flow in the downstream line thereby increasing the pressure drop and slowing the upstream side depressurization. The number of grooves 66 also depends on the diameter of the retaining element 14.

The flange 64 placed downstream of the flange 63 is drilled with a radial hole in which a protective tube 71 is placed. The rupture detector comprises an electric wire 72 fixed to the retaining part 65 on the downstream side and arranged in a loop. The electric wire 72 extends into the protective tube 71 up to a connecting box 73. The electric wire 72 extends along virtually the whole diameter of the retaining element 14, with a portion of wire 72*a* placed on one side of a groove 66 parallel to said groove 66 and the other portion of wire 72*b* placed radially on the other side of the same groove 66 parallel to said groove 66. The distance between the two wire portions 72*a*, 72*b* is short. This distance may be shorter than the maximum distance between two holes 67 so that the wire 72 passes between the holes 67.

The electric wire 72 is coated with a protective film which serves both to prevent its corrosion and to make it adhere to the downstream side of the retaining part 65. The composition of this film is selected to avoid changing the rupture pressure of the rupture element 14. The film can be made from embrittled polyamide. The bursting of the rupture element necessarily causes the cutting of the electric wire 72. This cutting can be detected extremely simply and reliably by interrupting the flow of electricity passing through the wire 72 or from the voltage difference between the two ends of the wire 72.

The rupture element 14 also comprises a reinforcing part 74 placed between the flanges 63 and 64 in the form of a metal voile, for example made from stainless steel, aluminum, or aluminum alloy. The thickness of the reinforcing part 74 may be between 0.2 and 1 mm.

The reinforcing part 74 comprises a plurality of petals, for example five, separated by radial grooves 75 formed on their whole thickness. The petals are connected to an annular outer edge, a groove 76 in an arc of circle being formed on the whole thickness of each petal except close to the neighboring petals, thereby imparting to the petals a capacity to deform axially. One of the petals is connected to a central polygon 77, for example by welding. The polygon 77 closes the center of the petals and bears against hooks 78 fixed to the other petals and axially offset relative to the petals so that the polygon 77 is arranged axially between the petals and the corresponding hooks 78. The polygon 77 may come into contact with the bottom of the hooks 78 to bear against it axially. The reinforcing part 74 offers good axial strength in one direction and very low axial strength in the other direction, the burst direction of the rupture element 14. The reinforcing part 74 is particularly useful when the pressure in the tank 2 of the transformer 1 is lower than that of the depressurization chamber 16, which can occur if a partial vacuum is produced in the tank 2 for filling the transformer 1.

Between the retaining part 65 and the reinforcing part 74, a sealing part 79 can be placed comprising a thin film 80 of gastight synthetic material based for example on polytetrafluoroethylene surrounded on each side by a thick film 81 of precut synthetic material avoiding a perforation of the thin film 80 by the retaining part 65 and the reinforcing part 74. Each thick film 81 may comprise a synthetic material based for example on polytetrafluoroethylene, having a thickness of about 0.1 to 0.3 mm. The thick films 81 can be precut along an arc of circle of about 330°. The thin film 80 may have a thickness of about 0.005 to 0.1 mm.

The rupture element 14 offers good pressure resistance in one direction, calibrated pressure resistance in the other direction, excellent gastightness and low bursting inertia.

To improve the tightness, the rupture element 14 may comprise a washer 82 placed between the flange 63 and the retaining part 65 and a washer 83 placed between the flange 64 and the reinforcing part 74. The washers 82 and 83 can be made from a polytetrafluoroethylene based material.

Furthermore, means for cooling the fluids in the preventive device can be provided. The cooling means may comprise fins on the line 17 and/or the reservoir 18, a climate-control unit for the reservoir 18, and/or a liquefied gas reserve, for example nitrogen, which can be expanded to cool the reservoir 18.

The protective system is particularly appropriate for transformers placed in confined premises, underground mine, tunnel, construction subsoil, road or highway subsoil, etc. The protective system has an extremely small size in the normal operating state and, after tripping, can easily be restored to operating status by removing the inflatable bag which is easily transportable.

A control unit connected to the sensors of the pressure release element can also be connected to accessory sensors, such as a fire detector, vapor sensors (Buchholz) and power supply cell trip sensors to initiate fire extinguishing in case of failure of the explosion preventive system.

The invention offers the benefit of prevention against the explosion of a transformer element, particularly a tank, feedthrough, load changer, etc., which can be mounted on an existing transformer with few modifications, which detects insulation breaks very rapidly and acts virtually simultaneously to limit the impact thereof, and in particular in confined premises. This prevents explosions of oil tanks and the raging fires that this can provoke. Damage due to short-circuits is significantly reduced and pollution can be almost completely avoided. Since the explosion of a transformer can prove catastrophic when it takes place in a confined place, the presence of a preventive system designed for confined premises proves to be extremely beneficial.

The invention claimed is:

1. A device for preventing the explosion of an element of an electrical transformer provided with a tank containing a combustible transformer cooling fluid, comprising a pressure release element, coupled to an outlet of the tank for decompressing the tank and a gastight inflatable bag coupled to an outlet orifice by a flange, said gastight inflatable bag being coupled to the outlet orifice with a sealed gastight connection downstream of the pressure release element and configured to pass from a substantially un-inflated state to a gas inflated state upon the rupture of the pressure release element and for confining combustible transformer cooling fluid passing through the pressure release element such that the combustible transformer cooling fluid does not leak from the gastight inflatable bag, wherein the pressure release element is configured to rupture such that substantially unrestricted release of gas occurs from the tank to the gastight inflatable bag when a predetermined pressure occurs in the tank.

2. The device as claimed in claim 1, comprising a bent line mounted downstream of the pressure release element.

3. The device as claimed in claim 1, comprising a flexible hose mounted upstream of the gastight inflatable bag.

4. The device as claimed in claim 3, comprising a bent line mounted downstream of the flexible hose.

5. The device as claimed in claim 1, comprising a gastight quick coupling placed upstream of the gastight inflatable bag, and integral with the gastight inflatable bag.

6. The device as claimed in claim 5, comprising a channel for introducing inert gas downstream of the pressure release element.

7. The device as claimed in claim 1, wherein the gastight inflatable bag comprises a blockable outlet orifice.

8. The device as claimed in claim 1, comprising a reservoir placed between the pressure release element and the gastight inflatable bag.

9. The device as claimed in claim 1, comprising a decompression chamber placed downstream of the pressure release element.

10. The device as claimed in claim 1, wherein the outlet of the tank is placed on a bottom wall of the tank, the gastight inflatable bag being placed under the tank.

11. The device as claimed in claim 1, wherein the outlet of the tank is placed on an upper wall of the tank, the gastight inflatable bag being placed above the tank.

12. The device as claimed in claim 1, wherein the gastight inflatable bag is at least partly suspended from a support.

13. The device as claimed in claim 1, comprising an anti-blowout protection placed at least under the gastight inflatable bag.

14. The device as claimed in claim 1, comprising a case provided with at least two shells, forming a transport and protection housing for the flat bag and a support for the inflated bag, said shells being configured to separate during the passage from the flat state to the inflated state.

15. A device for confining fluid from an element of an electrical transformer provided with a tank containing a combustible cooling fluid, comprising a pressure release element, configured to be tearable, coupled to an outlet of the tank for decompressing the tank, the pressure release element comprising tearing zones configured to tear when the pressure reaches a predetermined level, and a gastight inflatable bag coupled to an outlet orifice by a flange, wherein the flange is integral to the gastight inflatable bag and directly connected to the outlet orifice providing a direct end to end connection mechanism, said gastight inflatable bag being placed downstream of the pressure release element and configured to pass from a substantially un-inflated state to gas inflated state upon the tearing open of the pressure release element and for collecting fluid passing through the pressure release element.

16. A method for preventing the explosion of an element of an electrical transformer provided with a tank containing a combustible transformer cooling fluid, comprising allowing decompression of the tank, wherein the decompression of the tank includes the rupture of a pressure release element, coupled to an outlet of the tank, and the inflation of a gastight inflatable bag coupled to an outlet orifice by a flange, said gastight inflatable bag being coupled to the outlet orifice with a sealed gastight connection downstream of the pressure release element, the gastight inflatable bag passing from a substantially un-inflated state to an inflated state, and confining the gas passing through the pressure release element such that the combustible transformer cooling fluid does not leak from the gastight inflatable bag, wherein the pressure release element is configured to rupture such that substantially unrestricted release of gas occurs from the tank to the bag when a predetermined pressure occurs in the tank.

17. The device of claim 1, wherein the pressure release element comprises a disk and a diaphragm seal.

18. The device of claim 15, wherein the pressure release element comprises a disk and a diaphragm seal.

19. The device of claim 16, wherein the pressure release element comprises tearing zones configured to tear when the pressure reaches a predetermined level.

20. The device of claim 16, wherein the pressure release element comprises a disk and a diaphragm seal.

21. The device of claim 1, wherein the flange is integral to the gastight inflatable bag and directly connected to the outlet orifice providing a direct end to end connection mechanism.

22. The device of claim 16, wherein the flange is integral to the gastight inflatable bag and directly connected to the outlet orifice providing a direct end to end connection mechanism.

* * * * *